United States Patent
Ike

(10) Patent No.: US 10,214,208 B2
(45) Date of Patent: Feb. 26, 2019

(54) DRIVE ASSIST APPARATUS OF VEHICLE AND ONBOARD COMPUTER

(71) Applicant: Wataru Ike, Toyota (JP)

(72) Inventor: Wataru Ike, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/892,975

(22) PCT Filed: May 31, 2013

(86) PCT No.: PCT/JP2013/065229
§ 371 (c)(1),
(2) Date: Nov. 20, 2015

(87) PCT Pub. No.: WO2014/192143
PCT Pub. Date: Dec. 4, 2014

(65) Prior Publication Data
US 2016/0090085 A1    Mar. 31, 2016

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/04* (2013.01); *B60W 10/18* (2013.01); *B60W 10/30* (2013.01);
(Continued)

(58) Field of Classification Search
None
See application file for complete search history.

(56) References Cited

U.S. PATENT DOCUMENTS

2006/0139204 A1    6/2006    Abe et al.
2007/0008182 A1*   1/2007    Miyahara .............. G01S 13/867
                                                      340/937

(Continued)

FOREIGN PATENT DOCUMENTS

CN    101900562 A    12/2010
EP    1 772 840 A2    4/2007
(Continued)

OTHER PUBLICATIONS

Kohi, Bampow, "Designing and Materializing a System for Detecting an Obstacle Ahead of a Vehicle on the Basis of Radar and Mechanical Vision." Thesis Database, Jun. 30, 2011, pp. 8-11, 24, 38, 39, and 56-60.

*Primary Examiner* — Mussa A Shaawat
*Assistant Examiner* — Kyung J Kim
(74) *Attorney, Agent, or Firm* — Finnegan, Henderson, Farabow, Garrett & Dunner, LLP

(57) ABSTRACT

A system ECU (9) executes a collision avoidance operation in the following manner when a moving object that has suddenly appeared from a shadow of a predetermined object present around a vehicle moves toward a determination area set around the vehicle. That is, the system ECU (9) executes the collision avoidance operation at an early timing that is after a camera (6) detects the moving object, but before a radar (5) detects the moving object and the predetermined object, or more specifically, when an object expanding toward the determination area is detected by the radar (5). As a result, the collision avoidance operation is able to be performed quickly when a moving object that has appeared suddenly from the shadow of an object moves toward the determination area, while avoiding as much as possible unnecessary execution of the collision avoidance operation.

13 Claims, 6 Drawing Sheets

(51) Int. Cl.
  *B60W 10/30* (2006.01)
  *B60W 10/04* (2006.01)
  *G08G 1/16* (2006.01)

(52) U.S. Cl.
  CPC ............ *G08G 1/166* (2013.01); *G08G 1/167* (2013.01); *B60W 2420/42* (2013.01); *B60W 2420/52* (2013.01); *B60W 2710/18* (2013.01); *B60W 2710/30* (2013.01); *B60W 2720/10* (2013.01)

(56) References Cited

U.S. PATENT DOCUMENTS

2009/0303026 A1  12/2009  Broggi et al.
2010/0098297 A1  4/2010   Zhang

FOREIGN PATENT DOCUMENTS

| JP | 2005-084035 A | 3/2005 |
| JP | 2005-202878 | 7/2005 |
| JP | 2009-174900 | 8/2009 |
| JP | 2011-258121 A | 12/2011 |
| JP | 2012-048460 A | 3/2012 |
| WO | WO 2005/024464 A1 | 3/2005 |

* cited by examiner

| TIME | CAMERA DETECTION RESULTS | | | RADAR DETECTION RESULTS | | |
|---|---|---|---|---|---|---|
| | VEHICLE A | VEHICLE B | PEDESTRIAN | TARGET A (WIDTH) | TARGET B (WIDTH) | PEDESTRIAN |
| t1 | ○ | ○ | | ○ (2m) | ○ (2m) | |
| t2 | ○ | ○ | | ○ (2m) | ○ (2m) | |
| t3 | ○ | ○ | ○ | ○ (2m) | ○ (2.4m) | ○ |
| t4 | ○ | ○ | ○ | ○ (2m) | ○ (2.4m) | ○ |
| t5 | ○ | ○ | ○ | ○ (2m) | ○ (2m) | ○ |

FIG. 8

| | CAMERA DETECTION RESULTS | | | RADAR DETECTION RESULTS | | |
|---|---|---|---|---|---|---|
| TIME | VEHICLE A | VEHICLE B | PEDESTRIAN | TARGET A (WIDTH) | TARGET B (WIDTH) | PEDESTRIAN |
| t1 | ◯ | ◯ | | ◯ (2m) | ◯ (2m) | |
| t2 | ◯ | ◯ | | ◯ (2m) | ◯ (2m) | |
| t3 | ◯ | ◯ | ◯ | ◯ (2m) | ◯ (2.4m) | |
| t4 | ◯ | ◯ | ◯ | ◯ (2m) | ◯ (2m) | ◯ |
| t5 | ◯ | ◯ | ◯ | ◯ (2m) | ◯ (2m) | ◯ |
| t6 | ◯ | ◯ | ◯ | ◯ (2m) | ◯ (2m) | ◯ |
| t7 | ◯ | ◯ | ◯ | ◯ (2m) | ◯ (2m) | ◯ |
| t8 | ◯ | ◯ | ◯ | ◯ (2m) | ◯ (2m) | ◯ |
| t9 | ◯ | ◯ | ◯ | ◯ (2m) | ◯ (2m) | ◯ |
| t10 | ◯ | ◯ | ◯ | ◯ (2m) | ◯ (2m) | ◯ |

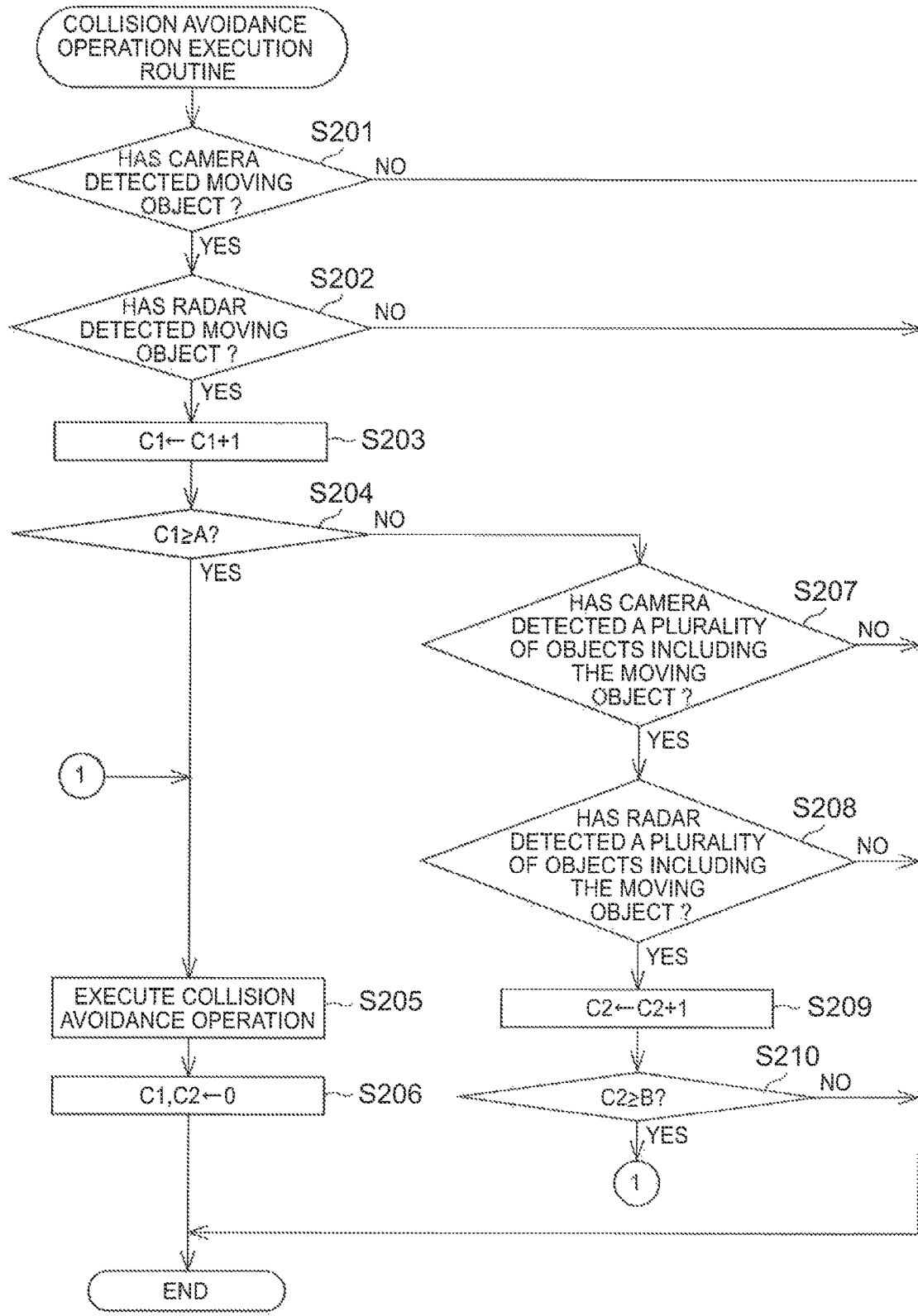

DRIVE ASSIST APPARATUS OF VEHICLE AND ONBOARD COMPUTER

CROSS-REFERENCE TO RELATED APPLICATIONS

This application is a national phase application of International Application No. PCT/JP2013/065229, filed May 31, 2013, the content of which is incorporated herein by reference.

TECHNICAL FIELD

The invention relates to a drive assist apparatus of a vehicle, and an onboard computer.

BACKGROUND ART

A drive assist apparatus of a vehicle such as an automobile is known that, when an object moving toward a determination area set around a vehicle (hereinafter, referred to as "moving object") is present, performs a collision avoidance operation in order to avoid a collision between the moving object and the vehicle. This kind of drive assist apparatus includes a first detecting portion capable of detecting an object present around the vehicle, and a second detecting portion capable of detecting the object by a different method from the first detecting portion, and also includes a control portion that performs the collision avoidance operation based on detection information obtained from the first detecting portion and the second detecting portion, as described in Patent Document 1, for example.

In this kind of drive assist apparatus, there is a need to avoid unnecessary execution of the collision avoidance operation, so in order to comply with this kind of need, it is necessary to execute the collision avoidance operation when it is able to be determined that the presence of the moving object is certain.

PRIOR ART DOCUMENTS

Patent Document

Patent Document 1: Japanese Patent Application Publication No. 2009-174900

SUMMARY OF THE INVENTION

Solution to Problem

If the moving object suddenly appears from a shadow of an object such as a parked vehicle or the like that is present around the vehicle and moves toward the determination area, the timing at which this moving object is detected by the first detecting portion and the second detecting portion may be delayed. If the timing at which the moving object is detected is delayed in this way, a collision avoidance operation may not be able to be quickly executed if execution of the collision avoidance operation is delayed until it is able to be determined that the presence of the moving object is certain.

It is thus an object of the invention to provide a drive assist apparatus of a vehicle, and an onboard computer, capable of quickly performing a collision avoidance operation when a moving object that has suddenly appeared from the shadow of an object moves toward a determination area set around the vehicle, while avoiding as much as possible unnecessary execution of the collision avoidance operation.

Solution to Problem

Hereinafter, means for solving the foregoing problem, and the operation and effects thereof, will be described.

A drive assist apparatus of a vehicle that solves the foregoing problem includes a first detecting portion for detecting an object, and a second detecting portion for detecting the object by a different method from the first detecting portion. Furthermore, the drive assist apparatus of a vehicle also includes a control portion configured to perform a collision avoidance operation when the first detecting portion detects an object moving toward a determination area set around the vehicle, and the second detecting portion detects an object moving toward the determination area.

If, when the first detecting portion detects an object moving toward the determination area (hereinafter, referred to as a "moving object") and the second detecting portion detects the moving object, it were determined that the presence of this moving object is certain and the collision avoidance operation were executed, then, even though it would be possible to avoid unnecessary execution of the collision avoidance operation, a problem such as that described below would be unavoidable. That is, when the moving object that has suddenly appeared from the shadow of a predetermined object present around the vehicle moves toward the determination area, it takes time to identify whether that moving object is the same object as the predetermined object using the first detecting portion and the second detecting portion. As a result, the timing at which the moving object is detected by both the first detecting portion and the second detecting portion may be delayed, so the collision avoidance operation may not be able to be quickly executed.

To address this problem, the control portion is configured to execute the collision avoidance operation when the first detecting portion detects an object moving toward the determination area (a moving object), and the second detecting portion detects an object expanding toward the determination area.

When the moving object that has suddenly appeared from the shadow of a predetermined object present around the vehicle moves toward the determination area, the moving object and the predetermined object are identified as separate objects, and the moving object and the predetermined object are detected. Meanwhile, the moving object and the predetermined object are also detected by the second detecting portion at a later timing than the detection of the moving object by the first detecting portion. More specifically, the second detecting portion identifies the moving object that suddenly appears from the shadow of the predetermined object and moves toward the determination area as being conjoined with the predetermined object, and detects that the identified conjoined object is expanding toward the determination area as the moving object moves. Then, when the moving object moves away from the predetermined object, the second detecting portion identifies the moving object as being separate from the predetermined object, and detects the moving object and the predetermined object.

The collision avoidance operation by this control portion is executed based on the first detecting portion detecting the moving object, and the second detecting portion detecting an object expanding toward the determination area, as described above. Therefore, when the moving object that has suddenly appeared from the shadow of a predetermined object present around the vehicle moves toward the determination area, the collision avoidance operation is executed after the first detecting portion detects the moving object, but before the second detecting portion detects the moving object. More specifically, the collision avoidance operation is executed at an early timing when an object expanding toward the determination area is detected by the second detecting portion. Also, when the moving object is detected by the first detecting portion, and an object expanding toward the determination area is detected by the second detecting portion, the certainty of the presence of the moving object is high, so if the collision avoidance operation is executed under this kind of circumstance, it will not be an unnecessary execution of the collision avoidance operation. Therefore, a collision avoidance operation is able to be quickly performed when a moving object that has suddenly appeared from the shadow of an object moves toward the determination area, while avoiding as much as possible unnecessary execution of the collision avoidance operation.

The control portion may be configured to perform a collision avoidance operation in the following manner. That is, the control portion performs a collision avoidance operation when the first detecting portion detects an object moving toward the determination area set ahead in a traveling direction of the vehicle (a moving object) in a direction crossing the traveling direction of the vehicle, and the second detecting portion detects an object moving toward the determination area in a direction crossing the traveling direction of the vehicle. Further, the control portion performs the collision avoidance operation also when the first detecting portion detects an object moving toward the determination area in a direction crossing the traveling direction of the vehicle, and the second detecting portion detects an object expanding toward the determination area in a direction crossing the traveling direction of the vehicle.

A camera that captures an image of an area around the determination area may be used as the first detecting portion, and a radar that transmits a detection wave toward the area around the determination area, and receives a reflected wave of the detection wave may be used as the second detecting portion. Also, the control portion may be configured to detect an object moving toward the determination area (a moving object) by checking an outline of an object on an image captured by the camera against a database related to outlines of various objects, and identify a plurality of objects at a predetermined resolution based on the detection wave transmitted from the radar and the reflected wave received by the radar.

In this case, when the moving object that has suddenly appeared from the shadow of a predetermined object present around the vehicle moves toward the determination area, the outline of the object on the image captured by the camera is checked against a database related to outlines of various objects, and the moving object is detected. Meanwhile, the moving object and the predetermined object are also detected by the radar at a timing later than the detection of the moving object by the camera. More specifically, if the distance between the moving object and the predetermined object is less than the resolution of the radar, it is detected that the identified conjoined object is expanding toward the determination area as the moving object moves. Also, when the moving object moves away from the predetermined object and the distance between the two becomes equal to or greater than the resolution of the radar, the moving object is identified as being separate from the predetermined object, and the moving object and the predetermined object are detected.

The collision avoidance operation by this control portion is executed when the camera detects the moving object, and the radar detects an object expanding toward the determination area, as described above. Therefore, when the moving object that has suddenly appeared from the shadow of a predetermined object present around the vehicle moves toward the determination area, the collision avoidance operation is executed at an early timing of after the camera detects the moving object, but before the radar detects the moving object and the predetermined object. More specifically, the collision avoidance operation is executed when the distance between the moving object and the predetermined object is less than the resolution of the radar, and an object expanding toward the determination area is detected by the radar.

A drive assist apparatus of a vehicle that solves the forgoing problem includes a first detecting portion for detecting an object, and a second detecting portion for detecting the object by a different method from the first detecting portion. Further, the drive assist apparatus of a vehicle also includes a control portion configured to, when the first detecting portion detects an object moving toward a determination area set around the vehicle, and the second detecting portion detects an object moving toward the determination area, increase a first number of detection times of the moving object by "1", and perform a collision avoidance operation when the first number of detection times reaches a predetermined number of times A.

If, when the first detecting portion detects an object moving toward the determination area, and the second detecting portion detects the moving object, it were determined that the presence of this moving object (hereinafter, referred to as a "moving object") is certain and the collision avoidance operation were executed when the first number of detection times of the moving object reaches the number of times A, then, even though it would be possible to avoid unnecessary execution of the collision avoidance operation, a problem such as that described below would be unavoidable. That is, when a moving object that has suddenly appeared from the shadow of a predetermined object present around the vehicle moves toward the determination area, it takes time to identify whether that moving object is the same object as the predetermined object, so the timing at which the moving object is detected may be delayed, and moreover, the timing at which the first number of detection times of the moving object reaches the number of times A may also be delayed. In this case, if a collision avoidance operation is executed as described above, this collision avoidance operation may not be able to be executed quickly.

To address this kind of problem, the collision avoidance operation is executed in the following manner. That is, when the first detecting portion detects a plurality of objects including an object moving toward the determination area, and the second detecting portion detects a plurality of objects including an object moving toward the determination area, a second number of detection times of the moving object (moving object) is increased by "1". Then, when the second number of detection times reaches a number of times B that is fewer than the number of times A, the collision avoidance operation is performed.

When a moving object that has suddenly appeared from the shadow of a predetermined object around the vehicle moves toward the determination area, the first detecting portion identifies the moving object and the predetermined object as being separate objects, and detects the moving object and the predetermined object. Meanwhile, the second detecting portion also identifies the moving object and the predetermined object as being separate objects, and detects the moving object and the predetermined object. When the moving object and the predetermined object are detected by both the first detecting portion and the second detecting portion in this way, the certainty of the presence of the moving object is high, so even if a collision avoidance operation is executed when the second number of detection times reaches the number of times B that is fewer than the number of times A, the likelihood that it will be an unnecessary execution of the collision avoidance operation is low. Also, by executing the collision avoidance operation when the second number of detection times reaches the number of times B, this collision avoidance operation is able to be executed at an earlier timing. Therefore, a collision avoidance operation is able to be quickly performed when a moving object that has suddenly appeared from the shadow of an object moves toward the determination area, while avoiding as much as possible unnecessary execution of the collision avoidance operation.

The control portion may be configured to perform a collision avoidance operation in the following manner. That is, when the first detecting portion detects an object moving toward the determination area set ahead in a traveling direction of the vehicle (a moving object) in a direction crossing the traveling direction of the vehicle, and the second detecting portion detects an object moving toward the determination area in a direction crossing the traveling direction of the vehicle, the control portion increases the first number of detection times of the object by "1". Then, the control portion performs a collision avoidance operation when the first number of detection times reaches a predetermined number of times A. Further, when the first detecting portion detects a plurality of objects including a moving object moving toward the determination area in a direction crossing the traveling direction of the vehicle, and the second detecting portion detects a plurality of objects including a moving object moving toward the determination area in a direction crossing the traveling direction of the vehicle, the control portion increase the second number of detection times of the object by "1". Then, the control portion performs a collision avoidance operation also when the second number of detection times reaches a number of times B that is fewer than the number of times A.

A camera that captures an image of an area around the determination area may be used as the first detecting portion, and a radar that transmits a detection wave to the area around the determination area, and receives a reflected wave of the detection wave may be used as the second detecting portion.

A value that is equal to or less than one-half of the number of times A may be used as the number of times B.

An onboard computer that solves the foregoing problem stores a control program that performs a collision avoidance operation, when a first detecting portion detects an object moving toward a determination area set around a vehicle (a moving object), and a second detecting portion capable of detecting an object moving toward the determination area by a different method from the first detecting portion detects the object moving. The control program performs the collision avoidance operation also when the first detecting portion detects a moving object moving toward the determination area, and the second detecting portion detects an object expanding toward the determination area.

An onboard computer that solves the foregoing problem stores a control program that, when a first detecting portion detects an object moving toward a determination area set around a vehicle (a moving object), and a second detecting portion capable of detecting the object by a different method from the first detecting portion detects an object moving toward the determination area, increases a first number of detection times of the moving object by "1", and performs a collision avoidance operation when the first number of detection times reaches a predetermined number of times A. When the first detecting portion detects a plurality of objects including the moving object moving toward the determination area, and the second detecting portion detects a plurality of objects including the moving object moving toward the determination area, the control program increases a second number of detection times of the moving object by "1", and performs the collision avoidance operation also when the second number of detection times reaches a number of times B that is fewer than the number of times A.

BRIEF DESCRIPTION OF THE DRAWINGS

FIG. 8 is a table illustrating detection modes of a plurality of vehicles and a pedestrian in a camera and radar.
FIG. 9 is a flowchart illustrating an execution procedure of the collision avoidance operation.

MODES FOR CARRYING OUT THE INVENTION

[First Example Embodiment]

Hereinafter, a first example embodiment of the drive assist apparatus of a vehicle will be described with reference to FIG. 1 to FIG. 7.

Figure 1:
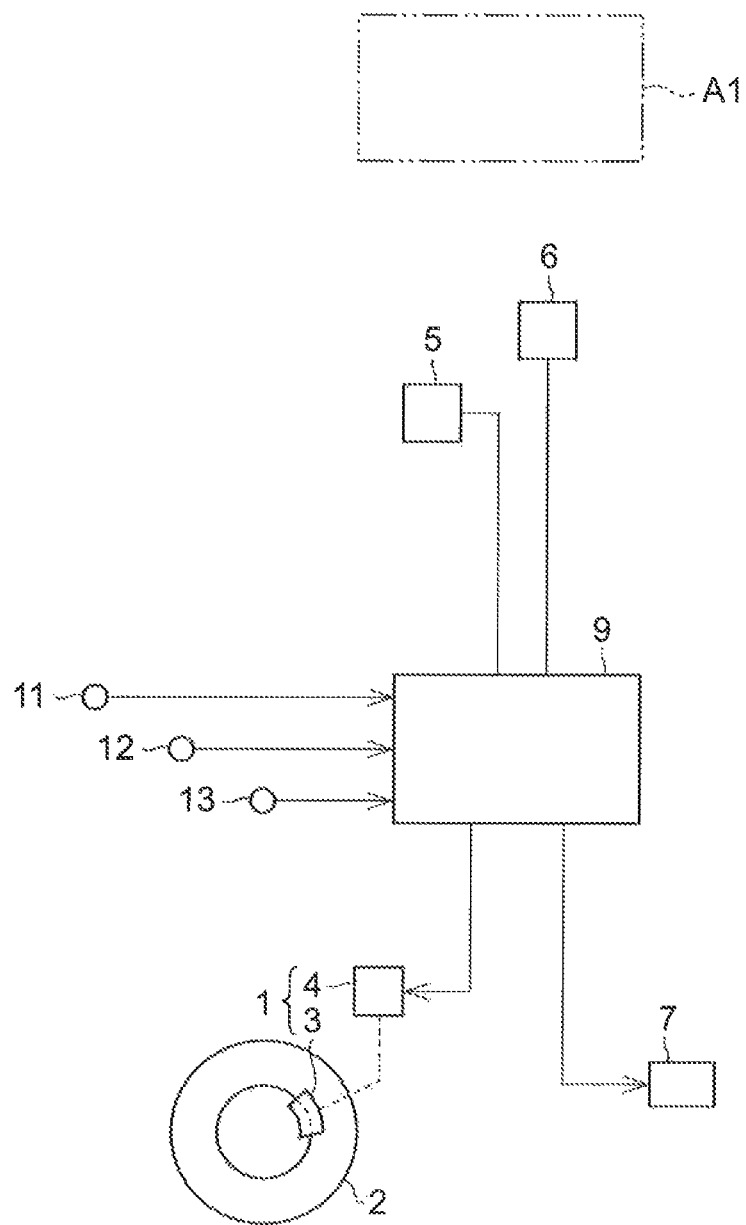
FIG. 1 is a simplified diagram of a drive assist apparatus.

The drive assist apparatus of a vehicle shown in FIG. 1 includes a system ECU 9 that executes various controls of the vehicle, such as drive control of a brake apparatus 1 that brakes a traveling vehicle, and operation control of an alarm device 7 that issues a warning to a driver of the vehicle. The brake apparatus 1 includes a brake caliper 3 for controlling rotation of a wheel 2, and an actuator 4 for driving the brake caliper 3. Also, any suitable device from among a warning light, a buzzer, and a display or the like can be employed as the alarm device 7.

A steering angle sensor 11 that detects a steering angle of a steering wheel when the vehicle turns, a yaw rate sensor 12 that detects a change in rate of a rotation angle when the vehicle turns, and a wheel speed sensor 13 that detects a rotation speed of the wheel 2, and the like, are connected to the system ECU 9. Also, the drive assist apparatus of the vehicle sets a determination area A1 around the vehicle, and includes a radar 5 that transmits a detection wave such as a millimeter wave to around that determination area A1 and receives reflected wave of that detection wave, and a camera 6 that captures the area around the determination area A1, and the like. Both the radar 5 and the camera 6 are also connected to the system ECU 9. The determination area A1 is set ahead in the traveling direction of the vehicle in this example.

The system ECU 9 monitors the transmission of the detection wave and the reception of the reflected wave in the radar 5, and obtains information related to an object present around the determination area A1, based on a time (propagation time) from transmission of the detection wave to reception of the reflected wave, and a frequency difference from the Doppler effect between the detection wave and the reflected wave and the like, and further, based on the image captured by the camera 6 and the like. Moreover, the system ECU 9 also obtains information related to the vehicle, such as the traveling direction of the vehicle, based on the steering angle sensor 11, the yaw rate sensor 12, and the wheel speed sensor 13 and the like. Also, the system ECU 9 is able to detect a plurality of objects including an object moving toward the determination area A1 (a moving object such as a pedestrian), based on the obtained information of the vehicle, and information related to an object present around the determination area A1 as described above.

More specifically, the system ECU 9 identifies an object present around the determination area A1 by performing so-called pattern matching, in which the system ECU 9 checks the outline of an object appearing in an image captured by the camera 6 against a database related to the outlines of various objects stored in non-volatile memory of the system ECU 9. Furthermore, the system ECU 9 identifies whether there is movement over time of the identified object, as well as the direction of that movement, based on images captured by the camera 6 at predetermined intervals of time. Through these identifications of an object, the system ECU 9 detects a moving object moving toward the determination area A1. When the system ECU 9 detects an object such as a moving object using the camera 6 as described above, this camera 6 functions as the first detecting portion for detecting an object.

Also, by ascertaining whether there is an object at predetermined intervals on a horizontal plane around the determination area A1 by the radar 5 at predetermined intervals of time, the system ECU 9 identifies the moving direction of the identified object, and whether that object is a single object or a plurality of objects. Incidentally, the minimum distance between a plurality of objects, at which it is possible for the system ECU 9 to identify whether the object ascertained by the radar 5 is a single object or a plurality of objects (hereinafter, referred to as the resolution of the radar 5), becomes greater the farther away these objects are from the vehicle, and becomes smaller closer to the vehicle. The system ECU 9 identifies a plurality of objects present around the determination area A1 at a resolution predetermined by the radar 5. Through these identifications of an object, the system ECU 9 detects a plurality of objects including a moving object moving toward the determination area A1. When the system ECU 9 detects an object such as a moving object using the radar 5 as described above, this radar 5 functions as the second detecting portion for detecting the object.

When an object moving toward the determination area A1, for example, in a direction crossing the traveling direction of the vehicle, (hereinafter, referred to as a "moving object") is present, the system ECU 9 performs a collision avoidance operation in order to avoid a collision with that moving object. The system ECU 9 at this time functions as a control portion for performing the collision avoidance operation. In other words, the system ECU 9 functions as an onboard computer that both stores a control program to execute the collision avoidance operation and executes this program. Examples of this collision avoidance operation include execution of an automatic braking operation that automatically turns on braking by the brake apparatus 1 of the vehicle, and execution of an output reducing operation that reduces the output of a prime mover for running such as an engine or a motor mounted in the vehicle. Also, as the collision avoidance operation, a warning to the driver of the vehicle by operation of the alarm device 7 can be executed, for example, a warning light, a warning display by a display, or a warning sound by a buzzer, can also be generated.

Here, a collision avoidance operation may be executed in the following manner, for example, in order to avoid unnecessary execution of the collision avoidance operation. That is, when the camera 6 detects a moving object moving toward the determination area A1, and the radar 5 detects the moving object, it is determined that the presence of this moving object is certain, so the collision avoidance operation is executed. In this case, even though unnecessary execution of the collision avoidance operation is avoided, when a moving object that has suddenly appeared from the shadow of a predetermined object that is present around the vehicle moves toward the determination area A1, it takes time to identify whether this moving object is the same object as the predetermined object using the camera 6 and the radar 5, respectively. As a result, the timing at which the moving object is detected by both the camera 6 and the radar 5 may be delayed. The reason for this will be described in detail below.

Figure 2:
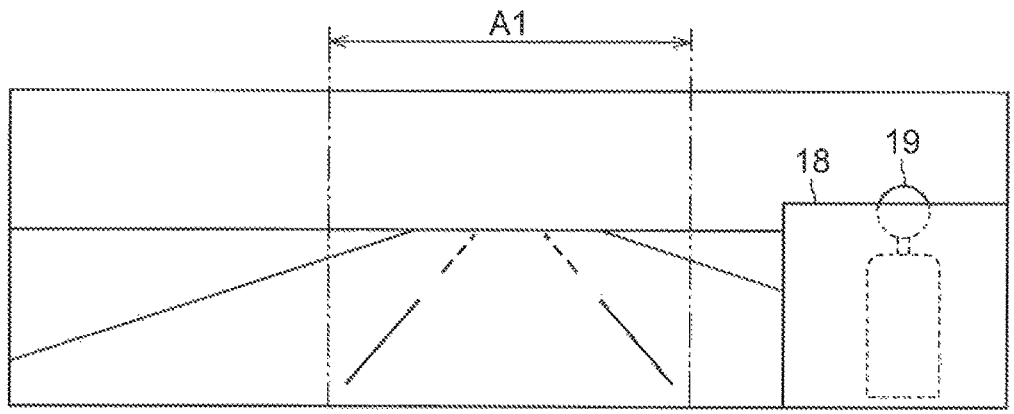
FIG. 2 is a simplified diagram of an image captured by a camera of the drive assist apparatus in FIG. 1.
Figure 3:
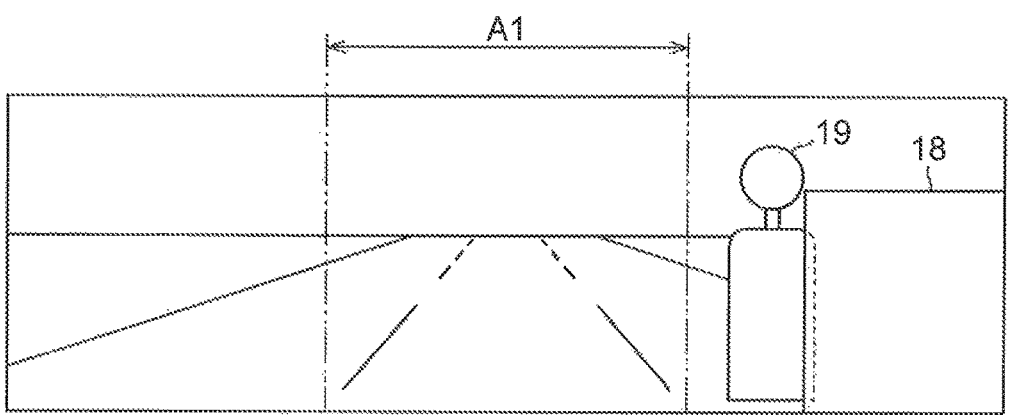
FIG. 3 is a simplified diagram of an image captured by the camera of the drive assist apparatus in FIG. 1.
Figure 4:
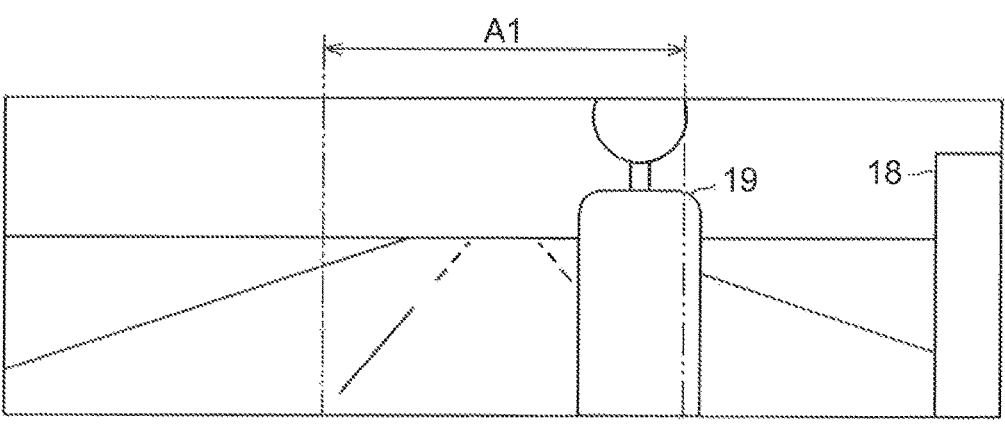
FIG. 4 is a simplified diagram of an image captured by the camera of the drive assist apparatus in FIG. 1.

FIG. 2 to FIG. 4 are views schematically showing images when an area around the determination area A1 (ahead in the traveling direction of the vehicle, in this example) is captured at predetermined intervals of time by the camera 6. As shown in FIG. 2, when a moving object (a pedestrian 19) is positioned in the shadow of an object (a parked vehicle 18) present around the vehicle, even though the parked vehicle 18 is able to be detected using both the camera 6 and the radar 5, the pedestrian 19 is unable to be detected using either the camera 6 or the radar 5. Also, as shown in FIG. 3, when the pedestrian 19 suddenly appears from the shadow of the parked vehicle 18 and moves toward the determination area A1, for example, in a direction crossing the traveling direction of the vehicle, the pedestrian 19 appearing in the image captured by the camera 6 is able to be recognized through the pattern matching described above. Moreover, whether there is movement of the pedestrian 19 over time, as well as the direction of that movement, are able to be identified based on the images captured by the camera 6 at predetermined intervals of time. As a result, the pedestrian 19 moving toward the determination area A1 in a direction crossing the traveling direction of the vehicle is able to be detected.

However, as shown in FIG. 3, when the pedestrian 19 suddenly appears from the shadow of the parked vehicle 18 and first moves toward the determination area A1 in a direction crossing the traveling direction of the vehicle, the distance between the pedestrian 19 and the parked vehicle 18 is less than the resolution of the radar 5. Therefore, using the radar 5, the pedestrian 19 and the parked vehicle 18 are unable to be identified as separate objects, and thus both end up being identified as a single object. Also, as the pedestrian 19 moves in a direction in which it suddenly appears from the parked vehicle 18 as described above, the object identified as a single object that is a combination of the pedestrian 19 and the parked vehicle 18 is detected expanding toward the determination area A1 in a direction crossing the traveling path of the vehicle. Then, when the distance between the pedestrian 19 that is moving as described above, and the parked vehicle 18, becomes equal to or greater than the resolution of the radar 5, the pedestrian 19 and the parked vehicle 18 are identified as separate objects using the radar 5, and consequently, the pedestrian 19 moving toward the determination area A1 in a direction crossing the traveling direction of the vehicle is detected, as shown in FIG. 4.

As is evident from this, when a moving object (the pedestrian 19) that has suddenly appeared from the shadow of an object (the parked vehicle 18) present around the vehicle moves toward the determination area A1, it takes time to identify whether this moving object is the same as the object, using the camera 6 and the radar 5, respectively. As a result, the timing at which the moving object is detected by both the camera 6 and the radar 5 is delayed. Therefore, if a collision avoidance operation is executed at a timing at which the moving object is detected by both the camera 6 and the radar 5 as described above, that collision avoidance operation may not be able to be executed quickly.

To address this kind of problem, the system ECU 9 performs the avoidance collision operation when the camera 6 detects an object moving toward the determination area A1 (a moving object), and also when the radar 5 detects an object that expanding toward the determination area A1.

Next, the operation of the drive assist apparatus of a vehicle according to this example embodiment will be described.

Let it be assumed that a moving object (the pedestrian 19 or the like) suddenly appears from the shadow of a predetermined object (the parked vehicle 18 or the like) present around the vehicle and attempts to move toward the determination area A1, for example, in a direction crossing the traveling direction of the vehicle. In this case, the system ECU 9 identifies the moving object and the predetermined object as separate objects, and consequently, detects the moving object and the predetermined object, with the camera 6. Meanwhile, the moving object and the predetermined object are also detected by the radar 5 at a timing later than the detection of the moving object by the camera 6. More specifically, the system ECU 9 identifies the moving object that has suddenly appeared as described above from the shadow of the predetermined object, as a conjoined object with the predetermined object, and detects the expansion of the identified conjoined object toward the determination area A1 in a direction crossing the traveling direction of the vehicle as that moving object moves, with the radar 5. Then, when the moving object moves away from the predetermined object, the system ECU 9 identifies the moving object as a separate object from the predetermined object, and consequently, detects the moving object and the predetermined object, with the radar 5.

The collision avoidance operation is executed by the system ECU 9 when the camera 6 detects the moving object moving toward the determination area A1, and the radar 5 detects an object expanding toward the determination area A1, as described above. Therefore, when a moving object that has suddenly appeared from the shadow of a predetermined object present ahead in the traveling direction of the vehicle moves toward the determination area A1 in a direction crossing the traveling direction of the vehicle, the collision avoidance operation is executed after the camera 6 detects moving object and the predetermined object, but before the radar 5 detects the moving object and the predetermined object. More specifically, a collision avoidance operation is executed at an early timing of when an object expanding toward the determination area A1 is detected by the radar 5. Also, when the moving object and the predetermined object are detected by the camera 6, and an object expanding toward the determination area A1 is detected by the radar 5, the certainty of the presence of the moving object is high, so if a collision avoidance operation is executed under this kind of circumstance, it will not be an unnecessary execution of the collision avoidance operation. Therefore, a collision avoidance operation is able to be quickly performed when a moving object that has suddenly appeared from the shadow of an object moves toward the determination area A1, while avoiding as much as possible unnecessary execution of the collision avoidance operation.

Figures 5, 6:
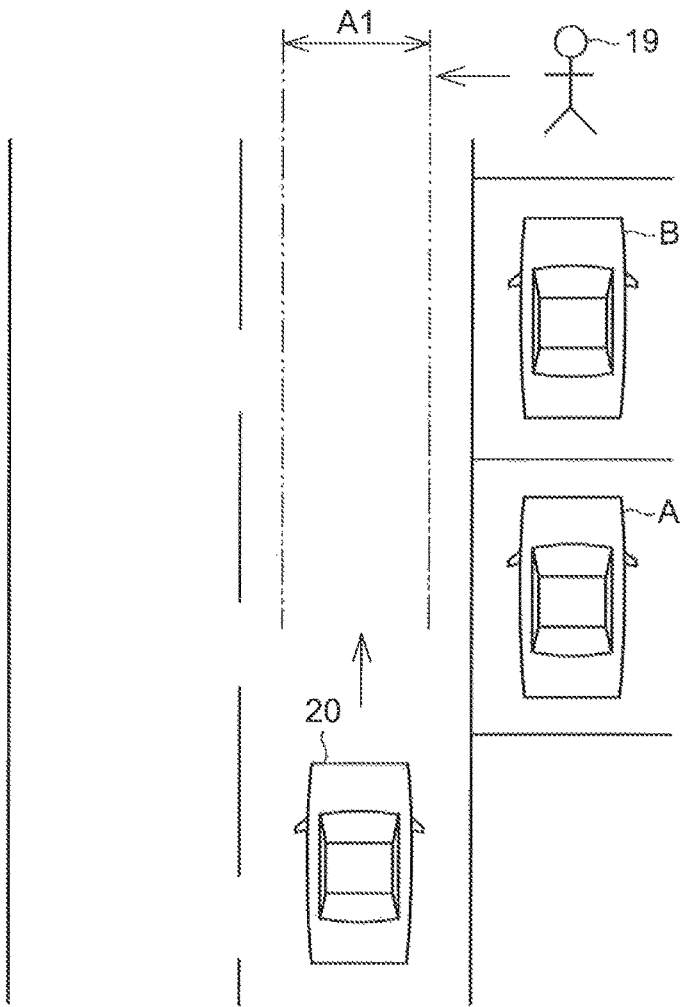
FIG. 5 is a schematic plan view of an example of a situation in which a collision avoidance operation is executed.
FIG. 6 is a table illustrating detection modes of a plurality of vehicles and a pedestrian in a camera and radar.

FIG. 5 is a view a schematic plan view of a situation in which the pedestrian 19 suddenly appears in front of a vehicle 20 from the shadow of a vehicle B parked ahead of a vehicle A and moves toward the determination area A1 in a direction crossing the traveling path of the vehicle 20, when the vehicle A and the vehicle B are parallel parked ahead in the traveling direction of the vehicle 20 that is traveling. In this situation, detection of the vehicle A, the vehicle B, and the pedestrian 19 by the camera 6 and the radar 5 is performed as shown in the table in FIG. 6, according to the passage of time from time t1 to time t5. In the table in FIG. 6, states in which the vehicle A, the vehicle B, and the pedestrian 19 are detected by the camera 6 and the radar 5 are indicated by a solid-line circle.

As is evident from FIG. 6, at time t1 and time t2, the camera 6 is unable to detect the pedestrian 19, even though it is able to detect the vehicle A and the vehicle B, respectively, and the radar 5 is unable to detect the pedestrian 19, even though it is able to detect a target A (corresponding to the vehicle A) and a target B (corresponding to the vehicle B), respectively. Then, at time t3 and time t4, the camera 6 is able to detect the vehicle A, the vehicle B, and the pedestrian 19, respectively, but the radar 5 is unable to detect the pedestrian 19, even though it is able to detect the target A and the target B, respectively. At this time, the radar 5 is unable to separately identify the pedestrian 19 and the vehicle B, and thus identifies the pedestrian 19 and the vehicle B as a single target B. Also, progressing from time t2 to times t3 and t4, it is detected that the target B expands toward the determination area A1 in a direction crossing the traveling direction of the vehicle, for example, expands from "2 m" to "2.4 m", as the pedestrian 19 moves away from the vehicle B. Furthermore, then at time t5, the camera 6 is able to detect the vehicle A, the vehicle B, and the pedestrian 19, respectively, and the radar 5 is also able to detect the target A, the target B, and the pedestrian 19, respectively.

When the pedestrian 19 that has suddenly appeared from the shadow of the vehicle B that is parked ahead in the traveling direction of the vehicle moves toward the determination area A1 in a direction crossing the traveling direction of the vehicle 20, it takes time to identify whether that pedestrian 19 is the same object as the vehicle B, using the camera 6 and the radar 5. That is, the camera 6 is able to identify the vehicle A, the vehicle B, and the pedestrian 19, respectively, at time t3, but the radar 5 is not able to identify the vehicle A, the vehicle B, and the pedestrian 19, respectively, and further, is not able to detect the pedestrian 19, until time t5 which is later than time t3. Therefore, if a collision avoidance operation is executed after the camera 6 and the radar 5 each detect the pedestrian 19, even if unnecessary execution of a collision avoidance operation is able to be avoided, the collision avoidance operation is only able to be executed at the late timing of time t5. Taking this into account, the system ECU 9 executes a collision avoidance operation when the camera 6 detects the pedestrian 19 moving toward the determination area A1, and the radar 5 detects the target B expanding toward the determination area A1. As a result, the collision avoidance operation can be executed at time t3 which is earlier than time t5, while avoiding as much as possible unnecessary execution of the collision avoidance operation.

Figure 7:
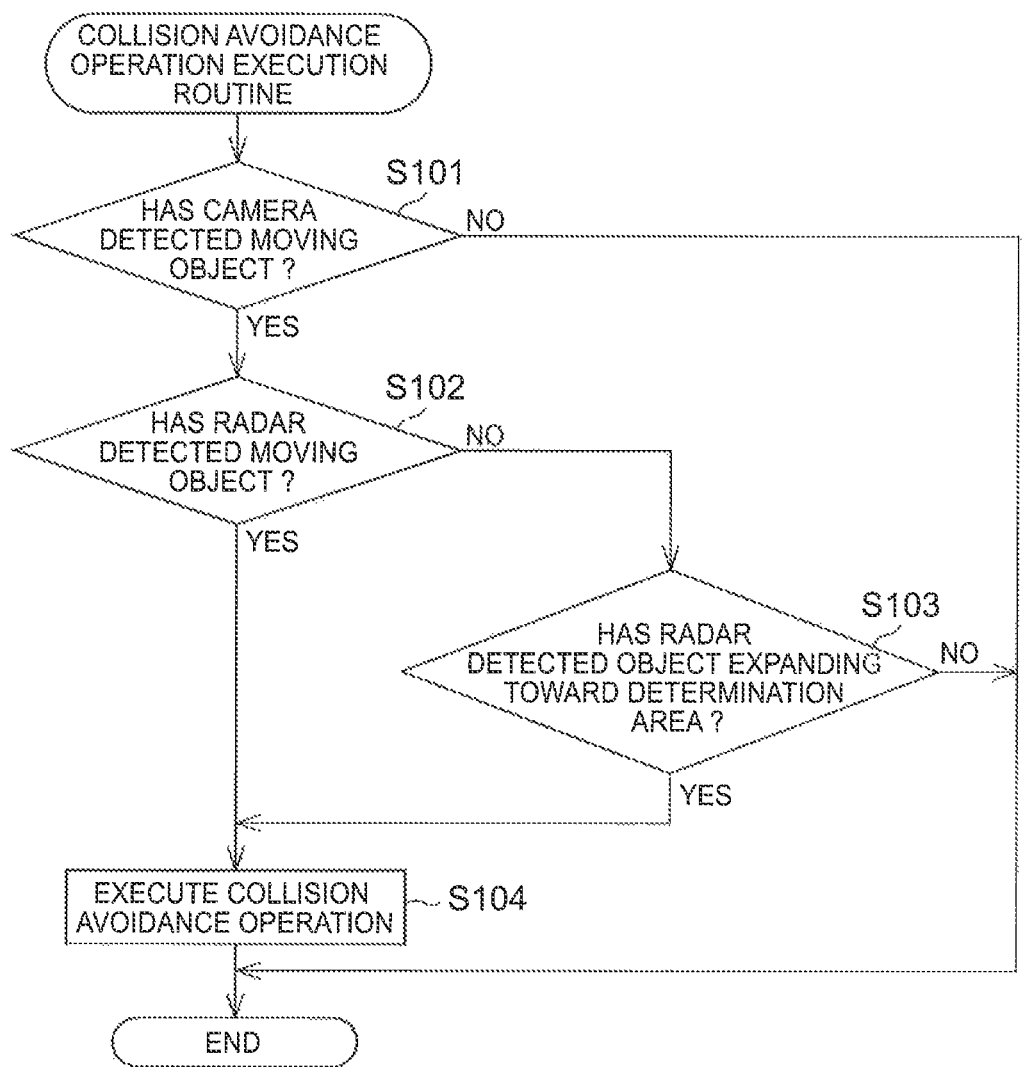
FIG. 7 is a flowchart illustrating an execution procedure of the collision avoidance operation.

FIG. 7 is a flowchart illustrating a collision avoidance operation execution routine that is executed via the system ECU 9. This collision avoidance operation execution routine is cyclically executed by interrupting at predetermined intervals of time, for example.

As the process of step 101 (S101) of the collision avoidance operation execution routine, the system ECU 9 determines whether the camera 6 has detected a moving object moving toward the determination area A1. If the determination in S101 is negative, the system ECU 9 ends this cycle of the collision avoidance operation execution routine. If the determination in S101 is positive, the system ECU 9 proceeds on to S102. As the process of S102, the system ECU 9 determines whether the radar 5 has detected a movable object moving toward the determination area A1. If the determination in S102 is positive, the system ECU 9 executes a collision avoidance operation as the process of S104. If the determination in S102 is negative, the system ECU 9 proceeds on to S103.

The processes of S103 and thereafter are processes for quickly executing the collision avoidance operation, when a moving object such as a pedestrian that has suddenly appeared from the shadow of an object such as a parked vehicle present around the vehicle moves toward the determination area A1. The system ECU 9 determines whether the radar 5 has detected an object (a target) expanding toward the determination area A1 as the process of S103. If the determination in S103 is positive, the system ECU 9 proceeds on to S104 and executes the collision avoidance operation. After executing the collision avoidance operation, the system ECU 9 ends this cycle of the collision avoidance operation execution routine. Also, if the determination in S103 is negative as well, the system ECU 9 ends this cycle of the collision avoidance operation execution routine.

According to the example embodiment described in detail above, the effects described below are able to be obtained.

(1) The system ECU 9 executes the collision avoidance operation in the following manner, when a moving object that has suddenly appeared from the shadow of a predetermined object present around the vehicle moves toward the determination area A1, for example, in a direction crossing the traveling direction of the vehicle. That is, the system ECU 9 executes the collision avoidance operation at an early timing that is after the moving object and the predetermined object are detected by the camera 6, but before the moving object and the predetermined object are detected by the radar 5, or more specifically, when an object expanding toward the determination area A1 is detected by the radar 5. As a result, the collision avoidance operation is able to be quickly performed when a moving object that has suddenly appeared from the shadow of an object moves toward the determination area A1, while avoiding as much as possible unnecessary execution of the collision avoidance operation.

(2) By detecting an object present around the determination area A1 with not only the camera 6 but also the radar 5, and executing a collision avoidance operation based on the detection of the object by both the camera 6 and the radar 5, unnecessary execution of this collision avoidance operation is avoided. Therefore, a collision avoidance operation is able to be accurately executed, without being executed unnecessarily, based on the detection of an object by both the camera 6 and the radar 5, while using an inexpensive monocular camera, without using a highly precise and extremely expensive camera, such as a stereo camera, as the camera 6.

[Second Example Embodiment]

Next, a second example embodiment of the drive assist apparatus of a vehicle will be described with reference to FIG. 8 and FIG. 9.

In order to avoid unnecessary execution of the collision avoidance operation, it is also conceivable to execute the collision avoidance operation in the following manner, for example, via the system ECU 9. That is, when a moving object moving toward the determination area A1 is detected by both the camera 6 and the radar 5, and the number of detection times (a first number of detection times) reaches a predetermined number of times A (two or more times), it is determined that the presence of the moving object is certain, and the collision avoidance operation is executed. In this case, even though unnecessary execution of the collision avoidance operation is avoided, when the moving object that has suddenly appeared from the shadow of a predetermined object present around the vehicle moves toward the determination area A1, for example, in a direction crossing the travel direction of the vehicle, it takes time to identify, using the radar 5, whether that moving object is the same object as the object. As a result, the timing at which the moving object is detected may be delayed, and further, the timing at which the first number of detection times of the moving object reaches the number of times A may also be delayed. Therefore, if a collision avoidance operation is executed at the timing at which the first number of detection times reaches the number of times A, this collision avoidance operation may not be able to be executed quickly.

To address this kind of problem, the system ECU 9 executes the collision avoidance operation in the following manner, for example. That is, when the camera 6 detects a plurality of objects including the moving object moving toward the determination area A1, and the radar 5 detects a plurality of objects including the moving object, the system ECU 9 increases a second number of detection times of the moving object by "1", and executes a collision avoidance operation based on the fact that this second number of detection times has reached a number of times B that is fewer than the number of times A. A value equal to or less than one-half of the number of times A may conceivably be used as the number of times B.

Here, when a moving object (such as a pedestrian) that has suddenly appeared from the shadow of a predetermined object (such as a parked vehicle) present around the vehicle moves toward the determination area A1, for example, in a direction crossing the traveling direction of the vehicle, the camera 6 identifies the moving object and the predetermined object as separate objects, and detects the moving object and the predetermined object. On the other hand, the radar 5 also identifies the moving object and the predetermined object as separate objects, and detects the moving object and the predetermined object. When the moving object and the predetermined object are detected by both the camera 6 and the radar 5 in this way, the certainty of the presence of the moving object is high, so even if the collision avoidance operation is executed when the second number of detection times reaches the number of times B that is fewer than the number of times A, it will not be an unnecessary execution of the collision avoidance operation. Also, by executing the collision avoidance operation when the second number of detection times reaches the number of times B, that collision avoidance operation is able to be executed at an even earlier timing. Therefore, the collision avoidance operation is able to be quickly executed when a moving object that has suddenly appeared from the shadow of an object moves toward the determination area A1, while avoiding as much as possible unnecessary execution of the collision avoidance operation.

FIG. 8 is a table illustrating detection modes of the vehicle A, the vehicle B, and the pedestrian 19 by the camera 6 and the radar 5 in the situation illustrated in FIG. 5 of the first example embodiment, at predetermined intervals of time. In this table in FIG. 8 as well, states in which the vehicle A, the vehicle B, and the pedestrian 19 are detected by the camera 6 and the radar 5 are indicated by a solid-line circle. Also, the times t1 to t10 in the drawing indicate times of each execution interval of the detection of an object by the camera 6 and the radar 5.

As is evident from FIG. 8, at time t1, the camera 6 is unable to detect the pedestrian 19, even though it is able to detect the vehicle A and the vehicle B, respectively, and the radar 5 is also unable to detect the pedestrian 19, even though it is able to detect a target A (which corresponds to the vehicle A) and a target B (which corresponds to the vehicle B), respectively. Then, at time t2 and time t3, the camera 6 is able to detect the vehicle A, the vehicle B, and the pedestrian 19, respectively, but the radar 5 is unable to detect the pedestrian 19, even though it is able to detect the target A and the target B, respectively. At this time, the radar 5 is unable to separately identify the pedestrian 19 and the vehicle B, and thus identifies the pedestrian 19 and the vehicle B as a single target B. Also, progressing from time t2 to time t3, it is detected that the target B expands toward the determination area A1 in a direction crossing the traveling direction of the vehicle, for example, expands from "2 m" to "2.4 m", as the pedestrian 19 moves away from the vehicle B. Furthermore, then at time t4 and thereafter, the camera 6 is able to detect the vehicle A, the vehicle B, and the pedestrian 19, respectively, and the radar 5 also becomes able to detect the target A, the target B, and the pedestrian 19, respectively.

When the pedestrian 19 that has suddenly appeared from the shadow of the vehicle B parked ahead in the traveling direction of the vehicle moves toward the determination area A1 in a direction crossing the traveling direction of the vehicle 20, it takes time to identify, using the camera 6 and the radar 5, whether that pedestrian 19 is the same object as the vehicle B. That is, the camera 6 is able to identify and detect the vehicle A, the vehicle B, and the pedestrian 19, respectively, at times t2 and t3, but the radar 5 is unable to identify the vehicle A, the vehicle B, and the pedestrian 19, respectively, and moreover, is unable to detect the pedestrian 19, until time t4 which is later than time t3. Therefore, if the first number of detection times is increased by "1" when the camera 6 and the radar 5 each detect the pedestrian 19, and the collision avoidance operation is executed when that first number of detection times reaches the number of times A (e.g., 7 times), even if unnecessary execution of the collision avoidance operation is able to be avoided, the collision avoidance operation is only able to be executed at the late timing of time t10. Taking this into account, the system ECU 9 increases the second number of detection times by "1" when the camera 6 detects a plurality of objects including the pedestrian 19, and the radar 5 detects a plurality of objects including the pedestrian 19, and executes a collision avoidance operation when this second number of detection times reaches the number of times B (e.g., 3 times) that is fewer than the number of times A. As a result, the collision avoidance operation is able to be executed at time t6 which is earlier than time t10, while avoiding as much as possible unnecessary execution of the circumferential direction.

FIG. 9 is a flowchart illustrating a collision avoidance operation execution routine of this example embodiment that is executed via the system ECU 9. This collision avoidance operation execution routine is cyclically executed by interrupting at predetermined intervals of time, for example (in this example, execution intervals of detection of an object by the camera 6 and the radar 5).

As the process of step 201 (S201) in the collision avoidance operation execution routine, the system ECU 9 determines whether the camera 6 has detected a moving object moving toward the determination area A1. If the determination in S201 is positive, the system ECU 9 proceeds on to S202 and determines whether the radar 5 has detected a moving object moving toward the determination area A1. Also, if the determination in one of S201 and S202 is negative, the system ECU 9 ends this cycle of the collision avoidance operation execution routine. Also, if the determination in S202 is positive, the system ECU 9 proceeds on to S203.

As the process of S203, the system ECU 9 increases a counter C1 for counting the number of times (first number of detection times) that the camera 6 and the radar 5 each detect a moving object by "1". Moreover, the system ECU 9 determines whether the counter C1 is equal to or greater than the number of times A in the next process of S204. Here, if the determination here is positive, the system ECU 9 proceeds on to S205 and executes the collision avoidance operation. Then, the system ECU 9 resets the counter C1 and a counter C2, described later, to the initial value "0" as the process of S206, and then ends this cycle of the collision avoidance operation execution routine.

On the other hand, if the determination in S204 is negative, the system ECU 9 proceeds on to S207. The processes of S207 and thereafter are processes for quickly executing the collision avoidance operation when a moving object such as a pedestrian that has suddenly appeared from the shadow of an object such as a parked vehicle present around the vehicle moves toward the determination area A1. As the process of S207, the system ECU 9 determines whether the camera 6 has detected a plurality of objects including the moving object, and as the process of S208, the system ECU 9 determines whether the radar 5 has detected a plurality of objects including the moving object. If the determination in either of S207 and S208 is negative, the system ECU 9 ends this cycle of the collision avoidance operation execution routine. If the determination in both S207 and S208 is positive, the system ECU 9 proceeds on to S209.

As the process of S209, the system ECU 9 increases a counter C2 for counting the number of times (second number of detection times) that the camera 6 and the radar 5 have each detected a plurality of objects including the moving object by "1". Then as the process of S210, the system ECU 9 determines whether the counter C2 is equal to or greater than a number of times B that is fewer than the number of times A. If the determination here is negative, the system ECU 9 ends this cycle of the collision avoidance operation execution routine. On the other hand, if the determination in the process of S210 is positive, the system ECU 9 executes the collision avoidance operation as the process of S205, and then resets the counter C1 and the counter C2 to the initial value "0" as the process of S206.

According to the example embodiment described in detail above, the effect described below is able to be obtained in addition to an effect similar to that of (2) of the first example embodiment.

(3) The system ECU 9 executes the collision avoidance operation in the following manner when a moving object that has suddenly appeared from the shadow of a predetermined object present around the vehicle moves toward the determination area A1, for example, in a direction crossing the traveling direction of the vehicle. That is, the system ECU 9 executes the collision avoidance operation at an early timing that is before the second number of detection times when the camera 6 has detected the moving object and the predetermined object and the radar 5 has detected the moving object and the predetermined object, reaches the number of times A, or more specifically, that is when the second number of detection times reaches the number of times B that is fewer than the number of times A. As a result, the collision avoidance operation is able to be quickly performed when a moving object that has suddenly appeared from the shadow of an object moves toward the determination area A1, while avoiding as much as possible unnecessary execution of the collision avoidance operation.

[Other Example Embodiments]

The example embodiments may also be modified as described below, for example.

In the example embodiments described above, a determination area is set ahead in the traveling direction of a vehicle when the vehicle is traveling forward (ahead of a vehicle), and the camera 6 and the radar 5 detect an object present around that determination area, but examples other than this may also be used. For example, the examples illustrated in (a) to (d) below may also be used.

(a) A determination area is set behind in the traveling direction of a vehicle when the vehicle is traveling forward (to the rear of a vehicle), and the camera 6 and the radar 5 detect an object present around that determination area.

(b) A determination area is set ahead in the traveling direction of a vehicle when the vehicle is traveling in reverse (to the rear of the vehicle), and the camera 6 and the radar 5 detect an object present around that determination area.

(c) A determination area is set behind in the traveling direction of a vehicle when the vehicle is traveling in reverse (ahead of the vehicle), and the camera 6 and the radar 5 detect an object present around that determination area.

(d) A determination area is set to a side in the traveling direction of a vehicle when the vehicle is traveling forward or in reverse (to a side of the vehicle), and the camera 6 and the radar 5 detect an object present around that determination area.

In the first example embodiment, when a moving object moves toward the determination area A1, the collision avoidance operation can also be executed in the following manner in relation to the moving direction of that moving object. That is, the collision avoidance operation is executed when the camera 6 detects a moving object moving toward the determination area A1 in a direction crossing the traveling direction of the vehicle, and the radar 5 detects a moving object moving toward the determination area A1 in a direction crossing the traveling direction of the vehicle. Moreover, when a moving object that has suddenly appeared from the shadow of a predetermined object present around the vehicle moves toward the determination area A1, the collision avoidance operation is executed in the following manner in relation to the moving direction of that moving object. That is, the collision avoidance operation is executed when the camera 6 detects the moving object moving toward the determination area A1 in a direction crossing the traveling direction of the vehicle, and the radar 5 detects an object expanding toward the determination area A1 in a direction crossing the traveling direction of the vehicle.

In the second example embodiment, when a moving object moves toward the determination area A1, the collision avoidance operation can also be executed in the following manner in relation to the moving direction of that moving object. That is, when a moving object that has suddenly appeared from the shadow of a predetermined object present around the vehicle moves toward the determination area A1, the collision avoidance operation can also be executed in the following manner in relation to the moving direction of that moving object. That is, when the camera 6 detects the moving object moving toward the determination area A1 in a direction crossing the traveling direction of the vehicle, and the radar 5 detects a moving object moving toward the determination area A1 in a direction crossing the traveling direction of the vehicle, the first number of detection times of that moving object is increased by "1". Then, when that first number of detection times reaches a predetermined number of times A, the collision avoidance operation is executed. Moreover, when a moving object that has suddenly appeared from the shadow of a predetermined object present around the vehicle moves toward the determination area A1, the collision avoidance operation is executed in the following manner, in relation to the moving direction of that moving object. That is, when the camera 6 detects a plurality of objects including the moving object moving toward the determination area A1 in a direction crossing the traveling direction of the vehicle, and the radar 5 detects a plurality of objects including a moving object moving toward the determination area A1 in a direction crossing the traveling direction of the vehicle, the second number of detection times of that moving object is increased by "1". Then, when that second number of detection times reaches a number of times B that is fewer than the number of times A, the collision avoidance operation is executed.

A millimeter wave is given as an example of the detection wave of the radar 5, but a laser wave or an ultrasonic wave may also be used as this detection wave.

As the camera 6, a monocular camera may be used, or a stereo camera may be used.

The collision avoidance operation may be only the execution of a warning to the driver by the alarm device 7, only the execution of an automatic braking operation, or only a reduction in output of the prime mover.

By performing an automatic retracting operation that automatically retracts a seatbelt provided for a seat of the vehicle, that operation may be used as the collision avoidance operation for warning the driver, instead of the execution of a warning to a driver by the alarm device 7.

DESCRIPTION OF REFERENCE NUMERALS

1 . . . BRAKE APPARATUS, 2 . . . WHEEL, 3 . . . BRAKE CALIPER, 4 . . . ACTUATOR, 5 . . . RADAR, 6 . . . CAMERA, 7 . . . ALARM DEVICE, 9 . . . SYSTEM ECU, 11 . . . STEERING ANGLE SENSOR, 12 . . . YAW RATE SENSOR, 13 . . . WHEEL SPEED SENSOR, 18 . . . PARKED VEHICLE, 19 . . . PEDESTRIAN, 20 . . . VEHICLE.

The invention claimed is:

1. A drive assist apparatus of a vehicle, comprising:
a first detecting portion configured to detect an object by a first method;
a second detecting portion configured to detect the object by a second method different from the first method; and
a control portion configured to perform a collision avoidance operation when both the first detecting portion detects a first object moving toward a determination area set around the vehicle over a period of time in a direction crossing a traveling direction of the vehicle, and the second detecting portion detects the first object moving toward the determination area over predetermined intervals of time in the direction crossing the traveling direction of the vehicle,
wherein the control portion is configured to perform the collision avoidance operation also when both the first detecting portion detects the first object moving toward the determination area over the period of time in the direction crossing the traveling direction of the vehicle, and the second detecting portion detects a second object expanding toward the determination area over the predetermined intervals of time in the direction crossing the traveling direction of the vehicle, the second object corresponding to a combination of the first object and a third object, wherein the expanding is based on the first object moving toward the determination area.

2. The drive assist apparatus of a vehicle according to claim 1, wherein
the determination area is set ahead of the vehicle in the traveling direction of the vehicle.

3. The drive assist apparatus of a vehicle according to claim 1, wherein
the first detecting portion is a camera configured to capture an image of an area around the determination area;
the second detecting portion is a radar configured to transmit a detection wave to the area around the determination area, and to receive a reflected wave of the detection wave; and
the control portion is configured to detect the first object moving toward the determination area by checking an outline of the first object on an image captured by the camera against a database related to outlines of various objects, and identify a plurality of objects at a predetermined resolution based on the detection wave transmitted from the radar and the reflected wave received by the radar.

4. The drive assist apparatus of a vehicle according to claim 1, wherein the second detecting portion is configured to determine a size of the object.

5. A drive assist apparatus of a vehicle, comprising:
a first detecting portion configured to detect an object by a first method;
a second detecting portion configured to detect the object by a second method different from the first method; and
a control portion configured to, when both the first detecting portion detects the object moving toward a determination area set around the vehicle over a period of time in a direction crossing a traveling direction of the vehicle, and the second detecting portion detects the object moving toward the determination area over predetermined intervals of time in the direction crossing the traveling direction of the vehicle, increase a first number of detection times of the moving object by 1, and perform a collision avoidance operation when the first number of detection times reaches a first predetermined number of times,
wherein the control portion is configured to, when both the first detecting portion detects a plurality of objects including the object moving toward the determination area, and the second detecting portion detects a plurality of objects including the object moving toward the determination area, increase a second number of detection times of the moving object by 1, and perform the collision avoidance operation when the second number of detection times reaches a second predetermined number of times that is fewer than the first predetermined number of times.

6. The drive assist apparatus of a vehicle according to claim 5, wherein
the determination area is set ahead of the vehicle in the traveling direction of the vehicle.

7. The drive assist apparatus of a vehicle according to claim 5, wherein
the first detecting portion is a camera configured to capture an image of an area around the determination area; and
the second detecting portion is a radar configured to transmit a detection wave to the area around the determination area, and to receive a reflected wave of the detection wave.

8. The drive assist apparatus of a vehicle according to claim 5, wherein
the second predetermined number of times is equal to or less than one-half of the first predetermined number of times.

9. The drive assist apparatus of a vehicle according to claim 5, wherein the second detecting portion is configured to determine a size of the object.

10. A non-transitory computer readable medium storing a control program that performs a collision avoidance operation, when both a first detecting portion detects a first object moving toward a determination area set around a vehicle over a period of time in a direction crossing a traveling direction of the vehicle by a first method, and a second detecting portion capable of detecting the first object by a second method different from the first method detects the first object moving toward the determination area over predetermined intervals of time in the direction crossing the traveling direction of the vehicle,
wherein the control program performs the collision avoidance operation also when both the first detecting portion detects the first object moving toward the determination area, and the second detecting portion detects a second object expanding toward the determination area over the predetermined intervals of time in the direction crossing the traveling direction of the vehicle, the second object corresponding to a combination of the first object and a third object, wherein the expanding is based on the first object moving toward the determination area.

11. The drive assist apparatus of a vehicle according to claim 10, wherein the second detecting portion is configured to determine a size of the object.

12. A non-transitory computer readable medium storing a control program that, when both a first detecting portion detects an object moving toward a determination area set around a vehicle over a period of time in a direction crossing a traveling direction of the vehicle by a first method, and a second detecting portion capable of detecting the object by a second method different from the first method detects the object moving toward the determination area over predetermined intervals of time in the direction crossing the traveling direction of the vehicle, increases a first number of detection times of the moving object by 1, and performs a collision avoidance operation when the first number of detection times reaches a first predetermined number of times, wherein when both the first detecting portion detects a plurality of objects including the object moving toward the determination area, and the second detecting portion detects a plurality of objects including the object moving toward the determination area, the control program increases a second number of detection times of the moving object by 1, and performs the collision avoidance operation also when the second number of detection times reaches a second predetermined number of times that is fewer than the first predetermined number of times.

13. The drive assist apparatus of a vehicle according to claim 12, wherein the second detecting portion is configured to determine a size of the object.

\* \* \* \* \*